United States Patent
Sutkowski et al.

(10) Patent No.: US 10,870,809 B2
(45) Date of Patent: Dec. 22, 2020

(54) REFINERY ANTIFOULANT PROCESS

(71) Applicant: Infineum International Limited, Abingdon (GB)

(72) Inventors: Andrew C. Sutkowski, Norwich (GB); Krzysztof J. Maranski, Reading (GB); Paul Kerby, Oxford (GB)

(73) Assignee: Infineum International Limited (GB)

( * ) Notice: Subject to any disclaimer, the term of this patent is extended or adjusted under 35 U.S.C. 154(b) by 0 days.

(21) Appl. No.: 16/021,131

(22) Filed: Jun. 28, 2018

(65) Prior Publication Data

US 2019/0002775 A1  Jan. 3, 2019

(30) Foreign Application Priority Data

Jun. 30, 2017 (EP) .................... 17179026

(51) Int. Cl.
| | | |
|---|---|---|
| *C10G 75/00* | (2006.01) | |
| *C10G 75/04* | (2006.01) | |
| *C10G 7/10* | (2006.01) | |
| *C10L 10/04* | (2006.01) | |
| *C10L 1/14* | (2006.01) | |
| *C10G 7/06* | (2006.01) | |
| *C10L 1/198* | (2006.01) | |
| *C10L 1/182* | (2006.01) | |
| *C07F 3/00* | (2006.01) | |
| *C08L 37/00* | (2006.01) | |

(52) U.S. Cl.
CPC ............... *C10G 75/04* (2013.01); *C10G 7/06* (2013.01); *C10G 7/10* (2013.01); *C10L 1/143* (2013.01); *C10L 10/04* (2013.01); *C07F 3/00* (2013.01); *C08L 37/00* (2013.01); *C10L 1/1828* (2013.01); *C10L 1/198* (2013.01); *C10L 2200/0213* (2013.01); *C10L 2200/0461* (2013.01); *C10L 2290/02* (2013.01); *C10L 2290/06* (2013.01); *C10L 2290/543* (2013.01)

(58) Field of Classification Search
CPC ............. C10G 75/04; C10G 7/06; C10G 7/10
See application file for complete search history.

(56) References Cited

U.S. PATENT DOCUMENTS

| | | | | |
|---|---|---|---|---|
| 3,776,835 | A | * | 12/1973 | Dvoracek .............. C10G 75/04 208/48 AA |
| 4,828,674 | A | | 5/1989 | Forester |
| 6,140,279 | A | * | 10/2000 | Emert .................. C10M 167/00 508/192 |
| 2005/0279673 | A1 | * | 12/2005 | Eppig ..................... C10B 55/00 208/131 |
| 2010/0170829 | A1 | * | 7/2010 | Ng ......................... C09K 15/30 208/48 AA |
| 2014/0221261 | A1 | * | 8/2014 | Dodd ................. C10M 169/045 508/307 |
| 2017/0275553 | A1 | * | 9/2017 | Woodward .......... C10M 129/68 |

FOREIGN PATENT DOCUMENTS

| | | |
|---|---|---|
| CN | 106701194 A | 5/2017 |
| WO | 2014123736 A3 | 8/2014 |
| WO | WO 2014/123736 * | 8/2014 |

\* cited by examiner

*Primary Examiner* — Prem C Singh
*Assistant Examiner* — Brandi M Doyle

(57) ABSTRACT

Fouling in a hydrocarbon refining process is reduced by adding to a crude hydrocarbon for a refining process, an additive combination including:
(A) a polyalkenyl-substituted carboxylic acid or anhydride, and
(B) an overbased metal hydrocarbyl-substituted hydroxybenzoate detergent,
where the mass:mass ratio of (A) to (B) is in the range of 10:1 to 1:10, and the treat rate of the additive combination is in the range of 5 to 1000 ppm by mass.

10 Claims, No Drawings

REFINERY ANTIFOULANT PROCESS

FIELD OF THE INVENTION

This invention relates to additives to reduce fouling of crude hydrocarbon refinery components, and methods and systems using the additives.

BACKGROUND OF THE INVENTION

Petroleum refineries incur significant additional energy costs due to fouling and the resulting attendant inefficiencies caused by the fouling. More particularly, thermal processing of crude oils, blends and fractions in heat transfer equipment, such as heat exchangers, is hampered by the deposition of insoluble asphaltenes and other contaminants (e.g., particulates and salts) that may be found in crude oils. Further, the asphaltenes and other organics may thermally degrade to coke when exposed to high heater tube surface temperatures.

Fouling in heat exchangers receiving petroleum-type process streams can result from a number of mechanisms including chemical reactions, corrosion, deposit of existing insoluble impurities in the stream, and deposit of materials rendered insoluble by the temperature difference ($\Delta T$) between the process stream and the heat exchanger wall. For example, naturally-occurring asphaltenes can precipitate from the crude oil process stream, thermally degrade to form a coke and adhere to the hot surfaces. Further, the high $\Delta T$ found in heat transfer operations results in high surface or skin temperatures when the process stream is introduced to the heater tube surfaces, which contributes to the precipitation of insoluble particulates. Another common cause of fouling is attributable to the presence of salts, particulates and impurities (e.g. inorganic contaminants) found in the crude oil stream. For example, iron oxide/sulfide, calcium carbonate, silica, sodium chloride and calcium chloride have all been found to attach directly to the surface of a fouled heater rod and throughout the coke deposit. These solids promote and/or enable additional fouling of crude oils.

The buildup of insoluble deposits in heat transfer equipment creates an unwanted insulating effect and reduces the heat transfer efficiency. Fouling also reduces the cross-sectional area of process equipment, which decreases flow rates and desired pressure differentials to provide less than optimal operation. To overcome these disadvantages, heat transfer equipment is ordinarily taken offline and cleaned mechanically or chemically cleaned, resulting in lost production time.

Accordingly, there is a need to reduce precipitation/adherence of particulates and asphaltenes from the heated surface to prevent fouling, and before the asphaltenes are thermally degraded or coked. This will improve the performance of the heat transfer equipment, decrease or eliminate scheduled outages for fouling mitigation efforts, and reduce energy costs associated with the processing activity.

The art describes adding polyalkyl succinic acid derivative additives, namely succinimides, to reduce fouling. See, for example, U.S. Pat. No. 5,368,777 and WO-A-2011/014215. There is however a need to further improve anti-fouling performance.

Also, WO-2014/123736-A2 describes antifoulant compositions and methods for inhibiting fouling on structural parts of a system exposed to a fluid hydrocarbon or petrochemical stream where the antifoulant compositions may comprise at least one polyalkylene anhydride ester dispersant and an alkyl phosphate phenate.

SUMMARY OF INVENTION

The invention provides improvements in anti-fouling performance.

Thus, in a first aspect, the invention provides a method for reducing fouling in a hydrocarbon refining process comprising providing a crude hydrocarbon for a refining process; and adding to the hydrocarbon an additive combination comprising:
(A) a polyalkenyl-substituted carboxylic acid or anhydride, and
(B) an overbased metal hydrocarbyl-substituted hydroxybenzoate detergent dispersed in diluent,
where the mass:mass ratio of (A) to (B) is in the range of 10:1 to 1:10, such as 3:1 to 1:3, and the treat rate of the additive combination is in the range of 5 to 1000 ppm by mass.

In a second aspect, the invention provides a system for refining hydrocarbons comprising:
(A) at least one crude hydrocarbon refinery component; and
(B) crude hydrocarbon in fluid communication with the at least one refinery component, the crude hydrocarbon containing an additive combination as defined in the first aspect of the invention.

In a third aspect the invention provides the use of the additive combination as defined in the first aspect of the invention in a crude hydrocarbon to reduce fouling during use of the crude hydrocarbon in a hydrocarbon refining process.

DETAILED DESCRIPTION OF THE INVENTION

Definitions

The following definitions are provided for purpose of illustration and not limitation.

"Fouling" generally refers to the accumulation of unwanted materials on the surfaces of processing equipment or the like.

"Particulate-induced fouling" generally refers to fouling caused primarily by the presence of variable amounts of organic or inorganic particulates. Organic particulates (such as precipitated asphaltenes and coke particles) include, but are not limited to, insoluble matter precipitated out of solution upon changes in process conditions (e.g. temperature, pressure, or concentration) or a change in the composition of the feed stream (e.g. due to the occurrence of a chemical reaction). Inorganic particulates include but are not limited to silica, iron oxide, iron sulfide, alkaline earth metal oxides, sodium chloride, calcium chloride and other inorganic salts. One major source of these particulates results from incomplete solids removal during desalting and/or other particulate removing processes. Solids promote the fouling of crude oils and blends due to physical effects by modifying the surface area of heat transfer equipment, allowing for longer holdup times at wall temperatures and causing coke formation from asphaltenes and/or crude oil(s).

"Alkyl" refers to a monovalent hydrocarbon group containing no double or triple bonds and arranged in a branched or straight chain.

"Alkylene" refers to a divalent hydrocarbon group containing no double or triple bonds and arranged in a branched or straight chain.

"Alkenyl" refers to a monovalent hydrocarbon group containing one or more double bonds and arranged in a branched or straight chain.

"PIB" refers to polyisobutylene and includes both normal or "conventional" polyisobutylene and highly reactive polyisobutylene (HRPIB).

Reference to a group being a particular polymer (e.g., polypropylene, poly(ethylene-co-propylene) or PIB) encompasses polymers that contain primarily the respective monomer along with negligible amounts of other substitutions and/or interruptions along polymer chain. In other words, reference to a group being a polypropylene group does not require that the group consist of 100% propylene monomers without any linking groups, substitutions, impurities or other substituents (e.g. alkylene or alkenylene substituents). Such impurities or other substituents may be present in relatively minor amounts provided they do not affect the industrial performance of the additive, compared with the same additive containing the to respective polymer substituent at 100% purity.

A "hydrocarbyl" group refers to any univalent radical that is derived from a hydrocarbon, including univalent alkyl, aryl and cycloalkyl groups.

"Crude hydrocarbon refinery component" generally refers to an apparatus or instrumentality of a process to refine crude hydrocarbons, such as an oil refinery process, which is, or can be, susceptible to fouling. Crude hydrocarbon refinery components include, but are not limited to, heat transfer components such as a heat exchanger, a furnace, a crude preheater, a coker preheater, or any other heaters, a FCC slurry bottom, a debutanizer exchanger/tower, other feed/effluent exchangers and furnace air preheaters in refinery facilities, flare compressor components in refinery facilities and steam cracker/reformer tubes in petrochemical facilities. Crude hydrocarbon refinery components can also include other instrumentalities in which heat transfer can take place, such as a fractionation or distillation column, a scrubber, a reactor, a liquid-jacketed tank, a pipestill, a coker and a visbreaker. It is understood that "crude hydrocarbon refinery components," as used herein, encompasses tubes, piping, baffles and other process transport mechanisms that are internal to, at least partially constitute, and/or are in direct fluid communication with, any one of the above-mentioned crude hydrocarbon refinery components.

A reduction (or "reducing") in particulate-induced fouling is generally achieved when the ability of particulates to adhere to heated equipment surfaces is reduced, thereby mitigating their impact on the promotion of the fouling of crude oil(s), blends, and other refinery process streams.

In this specification, the following words and expressions, if and when used, have the meanings ascribed below:

"active ingredients" or "(a.i.)" refers to additive material that is not diluent or solvent;

"comprising" or any cognate word specifies the presence of stated features, steps, or integers or components, but does not preclude the presence or addition of one or more other features, steps, integers, components or groups thereof; the expressions "consists of" or "consists essentially of" or cognates may be embraced within "comprises" or cognates, wherein "consists essentially of" permits inclusion of substances not materially affecting the characteristics of the composition to which it applies;

"major amount" means 50 mass % or more, preferably 60 mass % or more, more preferably 70 mass % or more, even more preferably 80 mass % or more, of a composition;

"minor amount" means less than 50 mass %, preferably less than 40 mass %, more preferably less than 30 mass %, and even more preferably less than 20 mass %, of a composition;

"TBN" means total base number as measured by ASTM D2896.

Furthermore in this specification, if and when used:
"calcium content" is as measured by ASTM 4951;
"phosphorus content" is as measured by ASTM D5185;
"sulphated ash content" is as measured by ASTM D874;
"sulphur content" is as measured by ASTM D2622;
"KV100" means kinematic viscosity at 100° C. as measured by ASTM D445.

Also, it will be understood that various components used, essential as well as optimal and customary, may react under conditions of formulation, storage or use and that the invention also provides the product obtainable or obtained as a result of any such reaction.

Further, it is understood that any upper and lower quantity, range and ratio limits set forth herein may be independently combined.

Polyalkenyl-Substituted Carboxylic Acid or Anhydride (A)

(A) may constitute at least 1 to 7, preferably 2 to 6, mass % of the crude hydrocarbon. Preferably it constitutes 3 to 5, even more preferably 4 to 5, mass %.

It may be mono or polycarboxylic, preferably dicarboxylic. The polyalkenyl group preferably has from 8 to 400, such as 8 to 100, carbon atoms.

General formulae of exemplary anhydrides within (A) may be depicted as

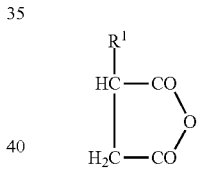

where $R^1$ represents a $C_8$ to $C_{100}$ branched or linear polyalkenyl group.

The polyalkenyl moiety may have a number average molecular weight of from 200 to 3000, preferably from 350 to 950.

Suitable hydrocarbons or polymers employed in the formation of the anhydrides used in the present invention to generate the polyalkenyl moieties include homopolymers, interpolymers or lower molecular weight hydrocarbons. One family of such polymers comprise polymers of ethylene and/or at least one $C_3$ to $C_{28}$ alpha-olefin having the formula $H_2C=CHR^1$ wherein $R^1$ is straight or branched-chain alkyl radical comprising 1 to 26 carbon atoms and wherein the polymer contains carbon-to-carbon unsaturation, preferably a high degree of terminal ethenylidene unsaturation. Preferably, such polymers comprise interpolymers of ethylene and at least one alpha-olefin of the above formula, wherein $R^1$ is alkyl of from 1 to 18, more preferably from 1 to 8, and more preferably still from 1 to 2, carbon atoms. Therefore, useful alpha-olefin monomers and comonomers include, for example, propylene, butene-1, hexene-1, octene-1, 4-methylpentene-1, decene-1, dodecene-1, tridecene-1, tetradecene-1, pentadecene-1, hexadecene-1, heptadecene-1, octadecene-1, nonadecene-1, and mixtures thereof (e.g., mixtures of propylene and butene-1). Exemplary of such polymers are propylene homopolymers, butene-1 homopolymers, ethylene-propylene copolymers, ethylene-butene-1 copolymers, and propylene-butene copolymers, wherein the polymer contains at least some terminal and/or internal unsaturation. Preferred polymers are unsaturated copolymers of ethylene and propylene and ethylene and butene-1. The interpolymers may contain a minor amount, e.g. 0.5 to 5 mole %, of a $C_4$ to $C_{18}$ non-conjugated diolefin comonomer. However, it is preferred that the polymers comprise only alpha-olefin homopolymers, interpolymers of alpha-olefin comonomers and interpolymers of ethylene and alpha-olefin comonomers. The molar ethylene content of the polymers employed is preferably in the range of 0 to 80, more preferably 0 to 60%. When propylene and/or butene-1 are employed as comonomer(s) with ethylene, the ethylene content of such copolymers is most preferably between 15 and 50%, although higher or lower ethylene contents may be present.

These polymers may be prepared by polymerizing an alpha-olefin monomer, or mixtures of alpha-olefin monomers, or mixtures comprising ethylene and at least one $C_3$ to $C_{28}$ alpha-olefin monomer, in the presence of a catalyst system comprising at least one metallocene (e.g., a cyclopentadienyl-transition metal compound) and an alumoxane compound. Using this process, a polymer in which 95% or more of the polymer chains possess terminal ethenylidene-type unsaturation can be provided. The percentage of polymer chains exhibiting terminal ethenylidene unsaturation may be determined by FTIR spectroscopic analysis, titration, or $C^{13}$ NMR. Interpolymers of this latter type may be characterized by the formula POLY—$C(R^1)$=$CH_2$ wherein $R^1$ is $C_1$ to $C_{26}$, preferably $C_1$ to $C_{18}$, more preferably $C_1$ to $C_8$, and most preferably $C_1$ to $C_2$, alkyl, (e.g., methyl or ethyl) and wherein POLY represents the polymer chain. The chain length of the $R^1$ alkyl group will vary depending on the comonomer(s) selected for use in the polymerization. A minor amount of the polymer chains can contain terminal ethenyl, i.e., vinyl, unsaturation, i.e. POLY-CH=$CH_2$, and a portion of the polymers can contain internal monounsaturation, e.g. POLY-CH=CH($R^1$), wherein $R^1$ is as defined above. These terminally unsaturated interpolymers may be prepared by known metallocene chemistry and may also be prepared as described in U.S. Pat. Nos. 5,498,809; 5,663,130; 5,705,577; 5,814,715; 6,022,929 and 6,030,930.

Another useful class of polymers is that of polymers prepared by cationic polymerization of isobutene and styrene. Common polymers from this class include polyisobutenes obtained by polymerization of a $C_4$ refinery stream having a butene content of 35 to 75 mass %, and an isobutene content of 30 to 60 mass %, in the presence of a Lewis acid catalyst, such as aluminum trichloride or boron trifluoride. A preferred source of monomer for making poly-n-butenes is petroleum feedstreams such as Raffinate II. These feedstocks are disclosed in the art such as in U.S. Pat. No. 4,952,739. Polyisobutylene is a most preferred backbone because it is readily available by cationic polymerization from butene streams (e.g., using $AlCl_3$ or $BF_3$ catalysts).

Such polyisobutylenes generally contain residual unsaturation in amounts of one ethylenic double bond per polymer chain, positioned along the chain. A preferred embodiment utilizes polyisobutylene prepared from a pure isobutylene stream or a Raffinate I stream to prepare reactive isobutylene polymers with terminal vinylidene olefins. Preferably, these polymers, referred to as highly reactive polyisobutylene (HR-PIB), have a terminal vinylidene content of at least 65, e.g., 70, more preferably at least 80, most preferably at least 85%. The preparation of such polymers is described, for example, in U.S. Pat. No. 4,152,499. HR-PIB is known and HR-PIB is commercially available under the tradenames Glissopal™ (from BASF).

Polyisobutylene polymers that may be employed are generally based on a hydrocarbon chain of from 400 to 3000. Methods for making polyisobutylene are known. Polyisobutylene can be functionalized by halogenation (e.g. chlorination), the thermal "ene" reaction, or by free radical grafting using a catalyst (e.g. peroxide), as described below.

The hydrocarbon or polymer backbone may be functionalized with carboxylic anhydride-producing moieties selectively at sites of carbon-to-carbon unsaturation on the polymer or hydrocarbon chains, or randomly along chains using any of the three processes mentioned above or combinations thereof, in any sequence.

Processes for reacting polymeric hydrocarbons with unsaturated carboxylic, anhydrides and the preparation of derivatives from such compounds are disclosed in U.S. Pat. Nos. 3,087,936; 3,172,892; 3,215,707; 3,231,587; 3,272,746; 3,275,554; 3,381,022; 3,442,808; 3,565,804; 3,912,764; 4,110,349; 4,234,435; 5,777,025; 5,891,953; as well as EP 0 382 450 B1; CA-1,335,895 and GB-A-1,440,219. The polymer or hydrocarbon may be functionalized, with carboxylic acid anhydride moieties by reacting the polymer or hydrocarbon under conditions that result in the addition of functional moieties or agents, i.e., acid anhydride, onto the polymer or hydrocarbon chains primarily at sites of carbon-to-carbon unsaturation (also referred to as ethylenic or olefinic unsaturation) using the halogen assisted functionalization (e.g. chlorination) process or the thermal "ene" reaction.

Selective functionalization can be accomplished by halogenating, e.g., chlorinating or brominating, the unsaturated α-olefin polymer to 1 to 8, preferably 3 to 7, mass % chlorine, or bromine, based on the weight of polymer or hydrocarbon, by passing the chlorine or bromine through the polymer at a temperature of 60 to 250, preferably 110 to 160, e.g., 120 to 140° C., for 0.5 to 10, preferably 1 to 7 hours. The halogenated polymer or hydrocarbon (hereinafter backbone) is then reacted with sufficient monounsaturated reactant capable of adding the required number of functional moieties to the backbone, e.g., monounsaturated carboxylic reactant, at 100 to 250, usually 180 to 235° C., for 0.5 to 10, e.g., 3 to 8, hours, such that the product obtained will contain the desired number of moles of the monounsaturated carboxylic reactant per mole of the halogenated backbones. Alternatively, the backbone and the monounsaturated carboxylic reactant are mixed and heated while adding chlorine to the hot material.

While chlorination normally helps increase the reactivity of starting olefin polymers with monounsaturated functionalizing reactant, it is not necessary with some of the polymers or hydrocarbons contemplated for use in the present invention, particularly those preferred polymers or hydrocarbons which possess a high terminal bond content and reactivity. Preferably, therefore, the backbone and the monounsaturated functionality reactant, (carboxylic reactant), are contacted at elevated temperature to cause an initial thermal "ene" reaction to take place. Ene reactions are known.

The hydrocarbon or polymer backbone can be functionalized by random attachment of functional moieties along the polymer chains by a variety of methods. For example, the polymer, in solution or in solid form, may be grafted with the monounsaturated carboxylic reactant, as described above, in the presence of a free-radical initiator. When performed in solution, the grafting takes place at an elevated temperature in the range of 100 to 260, preferably 120 to 240° C. Preferably, free-radical initiated grafting would be accomplished in a mineral lubricating oil solution containing, e.g., 1 to 50, preferably 5 to 30, mass % polymer based on the initial total oil solution.

The free-radical initiators that may be used are peroxides, hydroperoxides, and azo compounds, preferably those that have a boiling point greater than 100° C. and decompose thermally within the grafting temperature range to provide free-radicals. Representative of these free-radical initiators are azobutyronitrile, 2,5-dimethylhex-3-ene-2,5-bis-tertiary-butyl peroxide and dicumene peroxide. The initiator, when used, is typically in an amount of between 0.005 and 1% by weight based on the weight of the reaction mixture solution. Typically, the aforesaid monounsaturated carboxylic reactant material and free-radical initiator are used in a weight ratio range of from 1.0:1 to 30:1, preferably 3:1 to 6:1. The grafting is preferably carried out in an inert atmosphere, such as under nitrogen blanketing. The resulting grafted polymer is characterized by having carboxylic acid (or derivative) moieties randomly attached along the polymer chains, it being understood that some of the polymer chains remain ungrafted. The free radical grafting described above can be used for the other polymers and hydrocarbons used in the present invention.

The preferred monounsaturated reactants that are used to functionalize the backbone comprise mono- and dicarboxylic acid material, i.e., acid, or acid derivative material, including (i) monounsaturated $C_4$ to $C_{10}$ dicarboxylic acid wherein (a) the carboxyl groups are vicinyl, (i.e., located on adjacent carbon atoms) and (b) at least one, preferably both, of the adjacent carbon atoms are part of the mono unsaturation; (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated with the carboxy group, i.e., of the structure —C=C—CO—; and (iv) derivatives of (iii) such as $C_1$ to $C_5$ alcohol derived mono- or diesters of (iii). Mixtures of monounsaturated carboxylic materials (i)-(iv) also may be used. Upon reaction with the backbone, the monounsaturation of the monounsaturated carboxylic reactant becomes saturated. Thus, for example, maleic anhydride becomes backbone-substituted succinic anhydride, and acrylic acid becomes backbone-substituted propionic acid. Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, and methyl fumarate.

To provide the required functionality, the monounsaturated carboxylic reactant, preferably maleic anhydride, typically will be used in an amount ranging from equimolar amount to 100, preferably 5 to 50, mass % excess, based on the moles of polymer or hydrocarbon. Unreacted excess monounsaturated carboxylic reactant can be removed from the final dispersant product by, for example, stripping, usually under vacuum, if required.

Overbased Metal Detergent (B)

A metal detergent is an additive based on so-called metal "soaps", that is metal salts of acidic organic compounds, sometimes referred to as surfactants. They generally comprise a polar head with a long hydrophobic tail. Overbased metal detergents, which comprise neutralized metal detergents as the outer layer of a metal base (e.g. carbonate) micelle, may be provided by including large amounts of metal base by reacting an excess of a metal base, such as an oxide or hydroxide, with an acidic gas such as carbon dioxide. Examples of detergents include metal salicylates, phenates and salicylates and combinations thereof.

In the present invention, overbased metal detergents (B) are preferably overbased metal hydrocarbyl-substituted hydroxybenzoate, more preferably hydrocarbyl-substituted salicylate, detergents. The metal may be an alkali metal (e.g. Li, Na, K) or an alkaline earth metal (e.g. Mg, Ca).

"Hydrocarbyl" means a group or radical that contains carbon and hydrogen atoms and that is bonded to the remainder of the molecule via a carbon atom. It may contain hetero atoms, i.e. atoms other than carbon and hydrogen, provided they do not alter the essentially hydrocarbon nature and characteristics of the group. As examples of hydrocarbyl, there may be mentioned alkyl and alkenyl. A preferred overbased metal hydrocarbyl-substituted hydroxybenzoate is a calcium alkyl-substituted salicylate and has the structure shown:

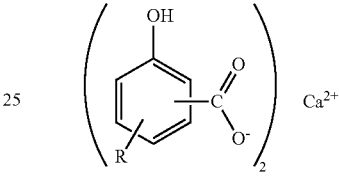

wherein R is a linear alkyl group. There may be more than one R group attached to the benzene ring. The $COO^-$ group can be in the ortho, meta or para position with respect to the hydroxyl group; the ortho position is preferred. The R group can be in the ortho, meta or para position with respect to the hydroxyl group.

Salicylic acids are typically prepared by the carboxylation, by the Kolbe-Schmitt process, of phenoxides, and in that case, will generally be obtained (normally in a diluent) in admixture with uncarboxylated phenol. Salicylic acids may be non-sulphurized or sulphurized, and may be chemically modified and/or contain additional substituents. Processes for sulphurizing an alkyl salicylic acid are well known to those skilled in the art, and are described in, for example, US 2007/0027057.

The alkyl groups advantageously contain 5 to 100, preferably 9 to 30, especially 14 to 24, carbon atoms.

The term "overbased" is generally used to describe metal detergents in which the ratio of the number of equivalents of the metal moiety to the number of equivalents of the acid moiety is greater than one. The term 'low-based' is used to describe metal detergents in which the equivalent ratio of metal moiety to acid moiety is greater than 1, and up to about 2.

By an "overbased calcium salt of surfactants" is meant an overbased detergent in which the metal cations of the oil-insoluble metal salt are essentially calcium cations. Small amounts of other cations may be present in the oil-insoluble metal salt, but typically at least 80, more typically at least 90, for example at least 95 mole % of the cations in the oil-insoluble metal salt, are calcium ions. Cations other than calcium may be derived, for example, from the use in the manufacture of the overbased detergent of a surfactant salt in which the cation is a metal other than calcium. Preferably, the metal salt of the surfactant is also calcium.

Carbonated overbased metal detergents typically comprise amorphous nanoparticles. Additionally, the art discloses nanoparticulate materials comprising carbonate in the crystalline calcite and vaterite forms.

The basicity of the detergents may be expressed as a total base number (TBN), sometimes referred to as base number (BN). A total base number is the amount of acid needed to neutralize all of the basicity of the overbased material. The TBN may be measured using ASTM standard D2896 or an equivalent procedure. The detergent may have a low TBN (i.e. a TBN of less than 50 mg KOH/g), a medium TBN (i.e. a TBN of 50 to 150 mg KOH/g) or a high TBN (i.e. a TBN of greater than 150, such as 150-500 mg KOH/g). The basicity may also be expressed as basicity index (BI), which is the molar ratio of total base to total soap in the overbased detergent.

Compositions for Reducing Fouling

The additives of this invention may be used in compositions that prevent fouling; the compositions may further contain a hydrophobic oil solubilizer and/or a dispersant for the additive(s). Such solubilizers may include, for example, surfactants and/or carboxylic acid solubilizers.

The compositions may further include, for example, viscosity index improvers, anti-foamants, antiwear agents, demulsifiers, anti-oxidants, and other corrosion inhibitors.

Examples

The present invention is illustrated by but in no way limited to the following examples.

Components

The following additive components and oil were used.

Component (A)

A component comprising 80% polyisobutene succinic anhydride ("PIBSA") derived from a polyisobutene having a number average molecular weight of 950, and 20% diluent in the form of SN150, a Group I oil.

Component (B)

An overbased calcium salicylate detergent having a basicity index of 8.

Crude Fuel Oil

A blend of Basra heavy (DIES1604959), Enbridge (DIES1603291) and Cimarex (DIES1506105) at respective percentages of 40, 10 and 50%.

Testing

Tests were carried out using 150 ml samples of the fuel oil blend containing no additives (as a control), and containing either 1000 or 500 ppm by mass of additive component(s) as indicated in the results table below, added to the blend as a cutback. As a comparison with the prior art, a test was carried out with a succinimide additive comprising the reaction product of a PIBSA (1000 MW) and tetraethylene pentamine (42% a.i. and base number 44 in mg KOH/g (referred to in the results table below as PIBSAPAM).

The tests used the 5 Rod JFTOT rig test which aims to simulate refinery antifoulant performance. The 5 Rod JFTOT is an instrument having five independently-heated test sections in series. Each test section comprises an electrically resistively-heated steel rod encased in an outer steel jacket, which is electrically isolated from the rod. The test fuel sample flows in the cavity between the rod and the jacket. The rod temperature is controlled at the centre point of the rod and is maintained constant throughout the test.

As the fuel flows over the hot rod, it absorbs heat from the rod; the temperature of the fuel leaving the test section is recorded.

If deposits accumulate on the rod surface, they reduce the heat transfer efficiency from the rod to the fuel thus giving rise to a reduction in the temperature of the fuel leaving the test section.

The difference in fuel outlet temperature between the start to the end of the test is calculated and summed for all five rods. A larger number indicates a greater temperature difference and hence worse fouling.

Tests were carried out for six hours with respective rod temperatures of 125, 195, 235, 275 and 315° C.; and for five hours with respective rod temperatures of 120, 160, 200, 240 and 280° C.

Results

| Additives (treat rate; ppm) | 5-hour test | 6-hour test |
| --- | --- | --- |
| None | −76 | −95 |
| (A) (500) | −56 | −102 |
| (A) + (B) (1000; 1:1) | −10 | −10 |
| (B) (500) | −35 | −38 |
| (B) (1000) | −21 | −18 |
| (A) (1000) | −44 | −95 |
| PIBSAPAM (1000) |  | −65 |

The results show that, in both tests, the additive combination of the invention ((A)+(B)) at 1000 ppm and in a 1:1 ratio) gave the best anti-fouling results, and that (A) and (B) operate synergistically. They also show that the additive combination of the invention gave better results than PIBSAPAM.

Comparative Testing

To demonstrate a surprising technical effect for additive combinations of the invention over additive combinations representative of WO-2014/123736-A2 ("'736"), the above-described 5-hour test was carried out using the following additive combinations:

Invention (A) PIBSA as above;
 (B) an overbased calcium salicylate having a TBN of 217-233 mg KOH/g, a metal content of 7.9-8.1 mass %, and an a. i. of 70%.

Comparison (A) a PIBSA-pentaerythritol (molecular weight 2000-3000) corresponding to the preferred embodiment described in paragraph [0029] of '736;
 (B) an overbased calcium phenate having a TBN of 250-265, a metal content of 9.2-9.8 mass %, and an a. i. of 57%.

In both cases, the additive combinations were used at (A):(B) ratios of 3:1 and at a treat rate of 500 ppm.

The results were as follows:

| Control (0 ppm additives) | −62 |
| --- | --- |
| Invention | −8 |
| Comparison | −20 |

These results show that the invention gave rise to surprisingly better anti-fouling results than the comparison.

What is claimed is:

1. A method for reducing fouling in a hydrocarbon refining process comprising providing a crude hydrocarbon for a refining process; and adding to the hydrocarbon an additive combination comprising:

(A) a polyalkenyl-substituted carboxylic acid or anhydride, and (B) an overbased metal hydrocarbyl-substituted hydroxybenzoate detergent dispersed in diluent, wherein the mass:mass ratio of (A) to (B) is in the range of 10:1 to 1:10, and the treat rate of the additive combination is in the range of 5 to 1000 ppm by mass.

2. The method of claim 1 where, in (A), the polyalkenyl substituent has from 8 to 400 carbon atoms.

3. The method of claim 1, wherein, in (A), the polyalkenyl substituent has a number average molecular weight of from 350 to 1000.

4. The method of claim 1, wherein (A) is a succinic acid anhydride.

5. The method of claim 4, wherein (A) is a polyisobutene succinic acid anhydride.

6. The method of claim 1, wherein, in (B), the metal is calcium.

7. The method of claim 1, wherein, in (B), the hydrocarbyl-substituted hydroxybenzoate is a salicylate.

8. The method of claim 1, wherein, in (B), the hydrocarbyl group has from 8 to 400 carbon atoms.

9. The method of claim 1, wherein, detergent (B) has a TBN in the range of from about 150 to about 500 mg KOH/g.

10. The method of claim 1, wherein the fouling is particulate-induced fouling.

* * * * *